US012616204B2

(12) United States Patent
Issaoui et al.

(10) Patent No.: US 12,616,204 B2
(45) Date of Patent: May 5, 2026

(54) USE OF CATIONIC PORPHYRINS AS SELECTIVE HERBICIDE

(71) Applicant: UNIVERSITE DE LIMOGES, Limoges (FR)

(72) Inventors: Mohamad Issaoui, Limoges (FR); Catherine Riou, Isle (FR); Vincent Sol, Limoges (FR)

(73) Assignee: UNIVERSITE DE LIMOGES, Limoges (FR)

( * ) Notice: Subject to any disclaimer, the term of this patent is extended or adjusted under 35 U.S.C. 154(b) by 202 days.

(21) Appl. No.: 18/546,845

(22) PCT Filed: Feb. 17, 2022

(86) PCT No.: PCT/FR2022/050290

§ 371 (c)(1),
(2) Date: Aug. 17, 2023

(87) PCT Pub. No.: WO2022/175633

PCT Pub. Date: Aug. 25, 2022

(65) Prior Publication Data

US 2024/0156098 A1 May 16, 2024

(30) Foreign Application Priority Data

Feb. 18, 2021 (FR) .................................. FR2101599

(51) Int. Cl.
*A01N 43/90* (2006.01)
*A01P 13/02* (2006.01)

(52) U.S. Cl.
CPC .............. *A01N 43/90* (2013.01); *A01P 13/02* (2021.08)

(58) Field of Classification Search
CPC ................................ A01N 43/90; A01P 13/02
See application file for complete search history.

(56) References Cited

PUBLICATIONS

Issawi et al.; Responses of an adventitious fast-growing plant to photodynamic stress: comparative study of anionic and cationic porphyrin effect on *Arabidopsis thaliana*; Scandinavian Plant Physiology Society; Physiologia Plantarum 162: 379-390. 2018 (Year: 2018).*

Issawi et al.; Plant photodynamic stress: study of molecular and cellular mechanisms in plant and plant cells upon porphyrin treatment; Agronomy; HAL Open Science; Université de Limoges, 2018. English. Dissertation Submitted on Jun. 7, 2019. (Year: 2019).*

Foliar spray—Google Search (Year: 2025).*

*Arabidopsis thaliana*—Google Search (Year: 2025).*

Guillaumot et al: "Synergistic enhancement of tolerance mechanisms in response to photoactivation of cationic tetra (N-methylpyridyl) porphyrins in tomato plantlets", Journal of Photochemistry and Photobiology B: Biology, vol. 156, p. 69-78, Jan. 26, 2016.

Issawi et al: "Responses of an adventitious fast-growing plant to photodynamic stress: comparative study of anionic and cationic porphyrin effect on *Arabidopsis thaliana*", Physiologia Plantarum, vol. 162, No. 3, p. 379-390, Dec. 20, 2017.

Riou et al: "Anionic porphyrin as a new powerful cell death inducer of Tobacco Bright Yellow-2 cells", Photochemical and Photobiological Sciences, vol. 13, No. 4, Jan. 1, 2014.

* cited by examiner

*Primary Examiner* — Robert A Wax
*Assistant Examiner* — John W Lippert, III
(74) *Attorney, Agent, or Firm* — WCF IP

(57) ABSTRACT

The present invention relates to the use of cationic porphyrins such as zinc tetra(N-methylpyridyl)porphyrin tetrachloride and tetra(N-methylpyridyl)porphyrin tetrachloride or a mixture thereof, as selective foliar herbicidal agent.

17 Claims, 10 Drawing Sheets

[Fig. 1]
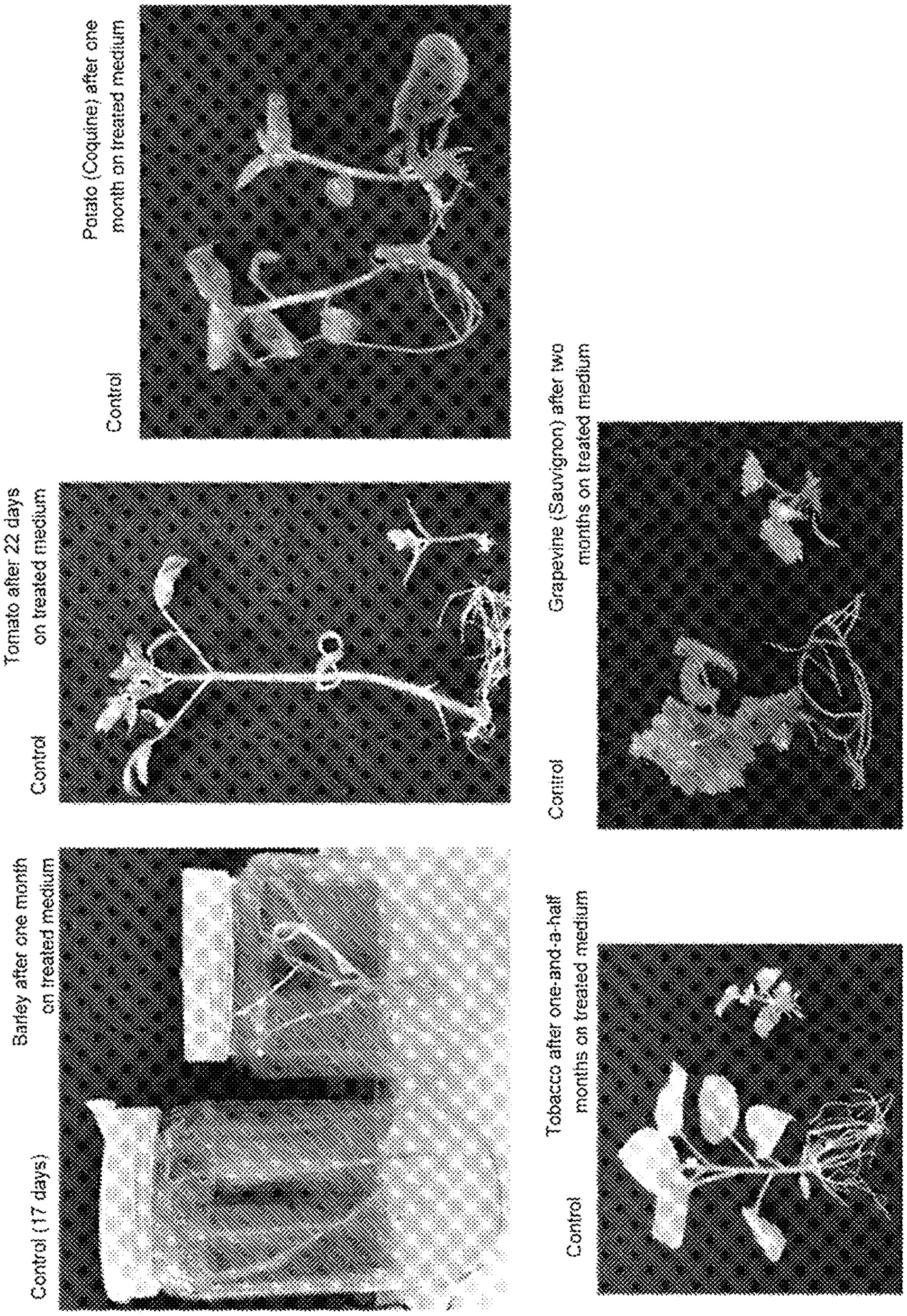

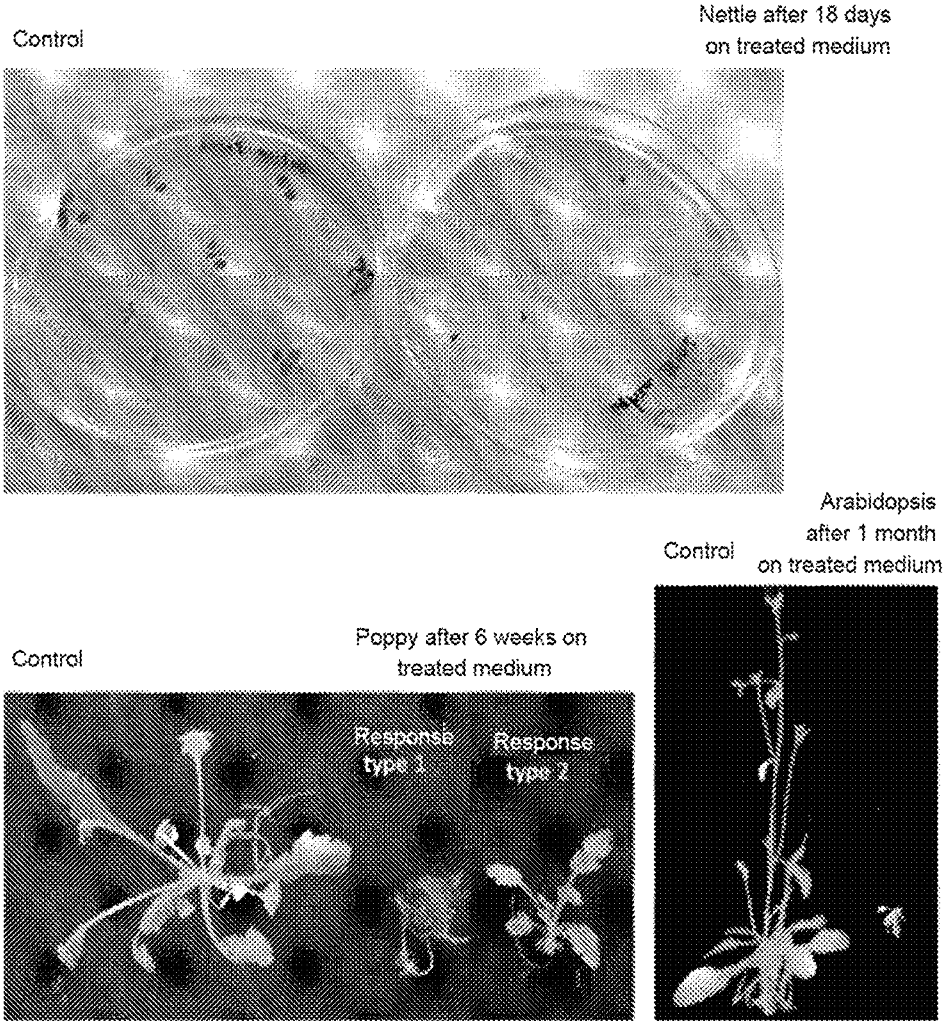
[Fig. 2]
Control        Nettle after 18 days on treated medium
Control      Poppy after 6 weeks on treated medium
Response type 1    Response type 2
Arabidopsis after 1 month on treated medium
Control

[Fig. 3]
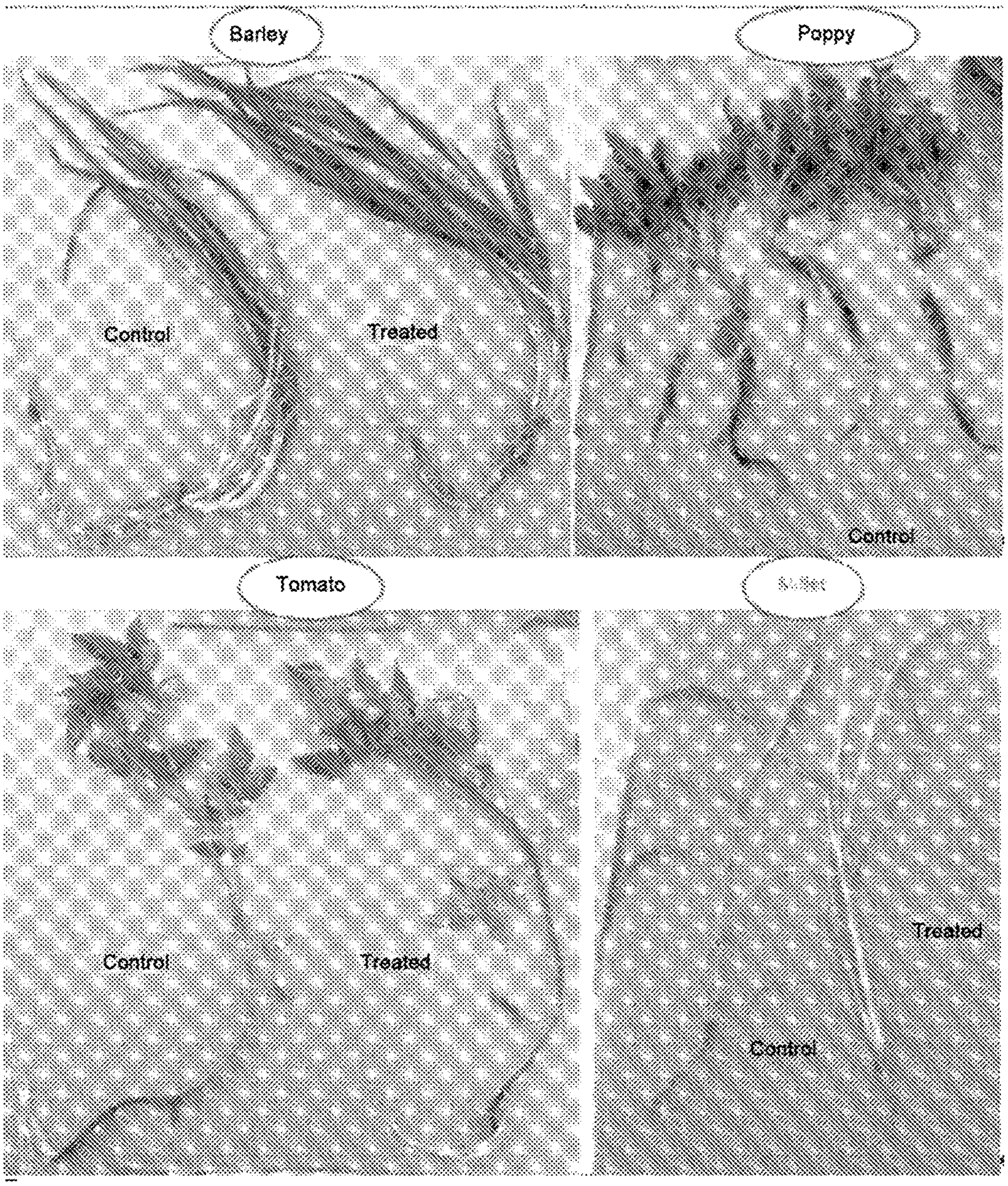

[Fig. 4]
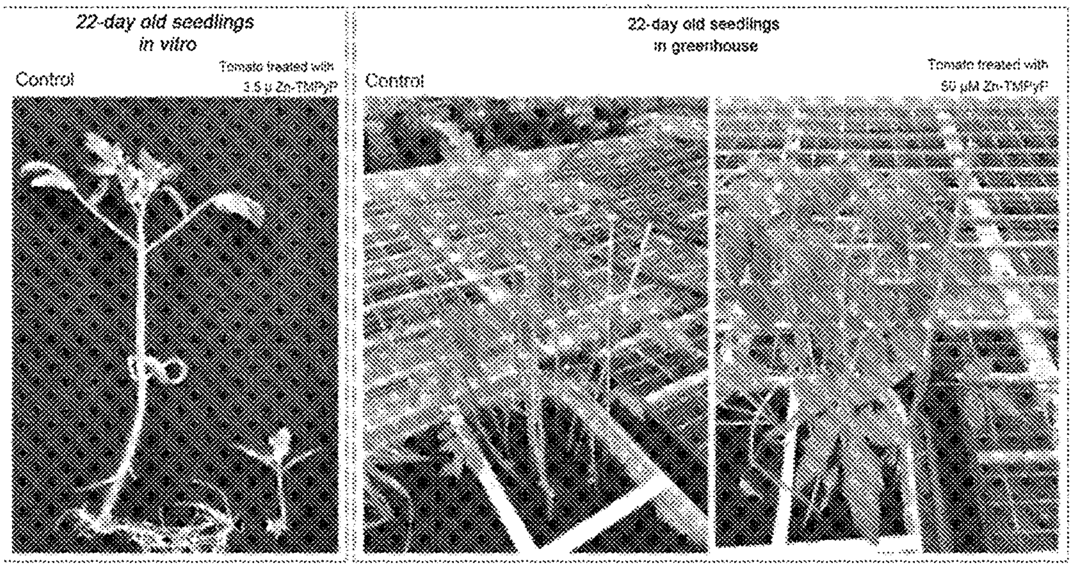
[Fig. 5]
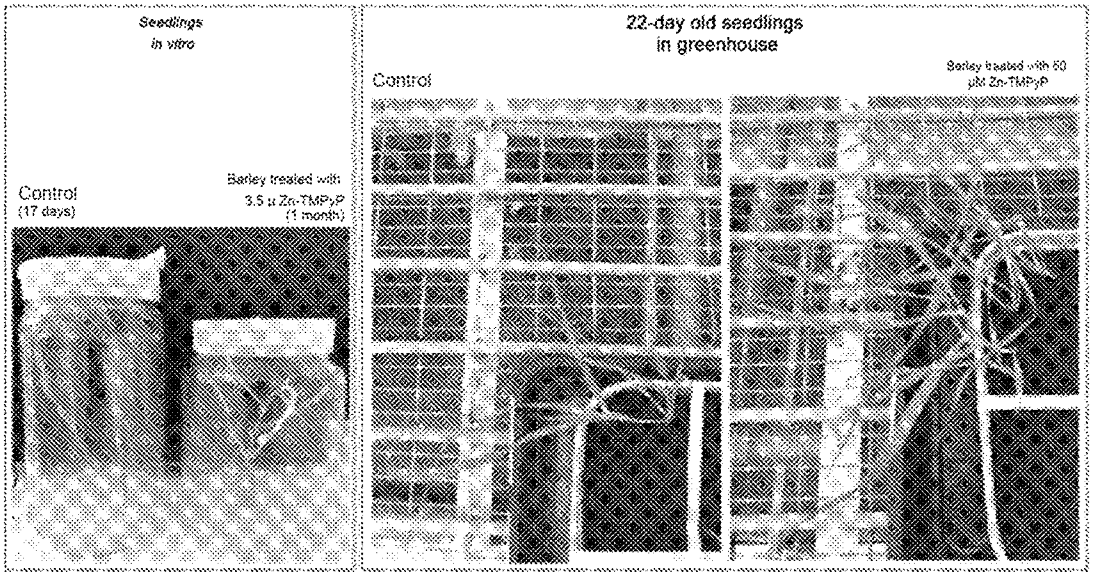

[Fig. 6]
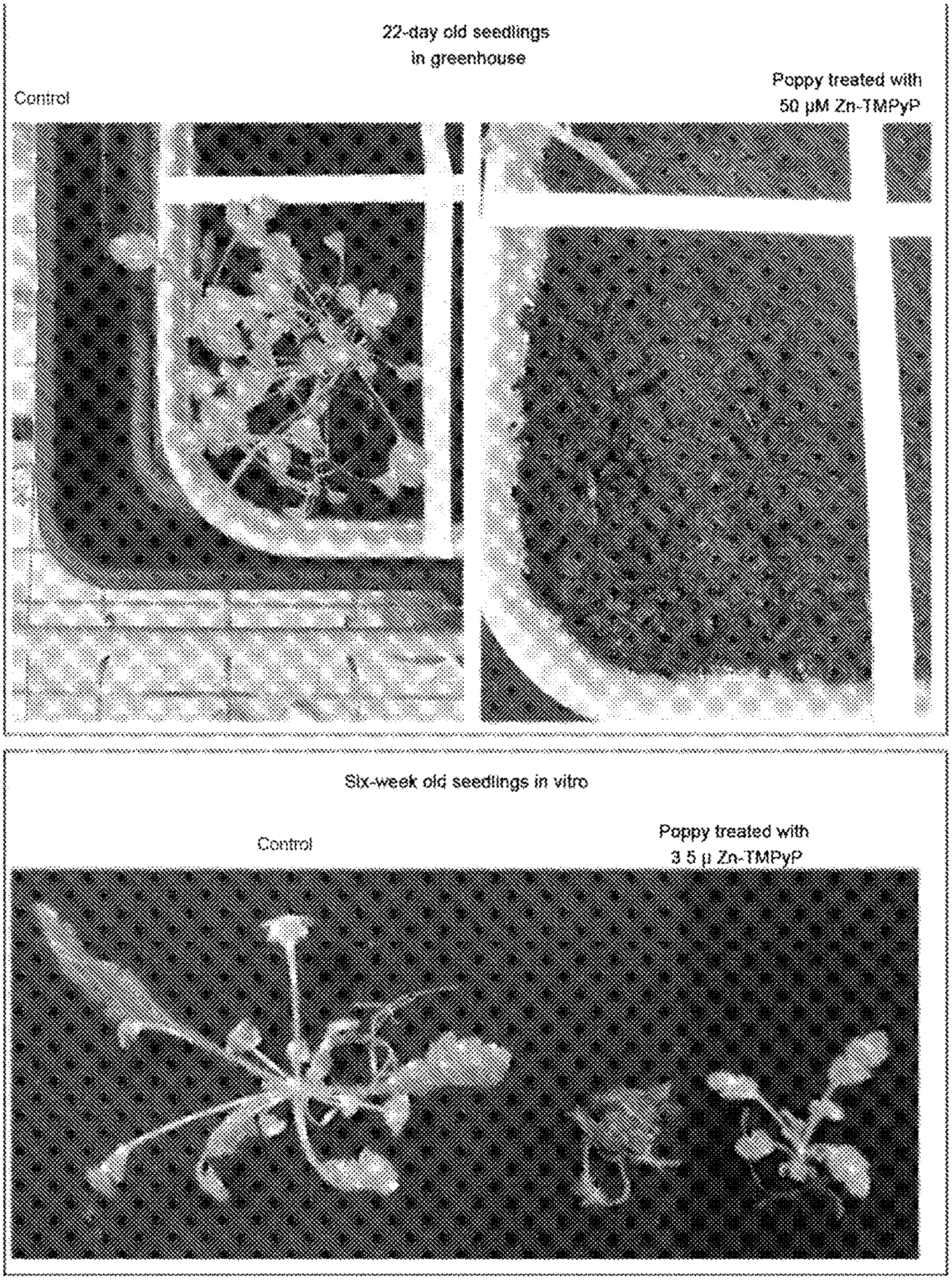

[Fig. 7]
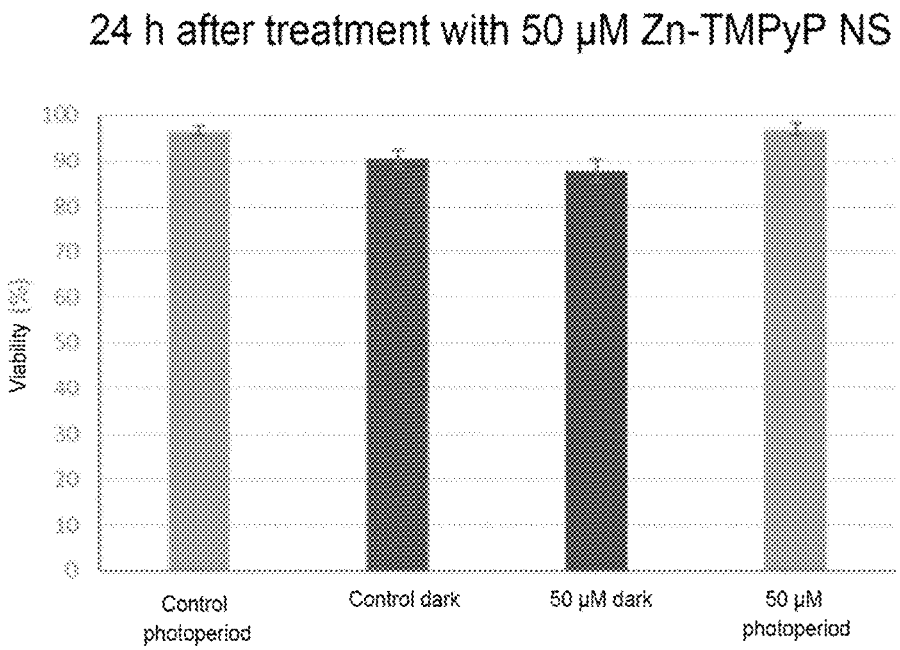
[Fig. 8]
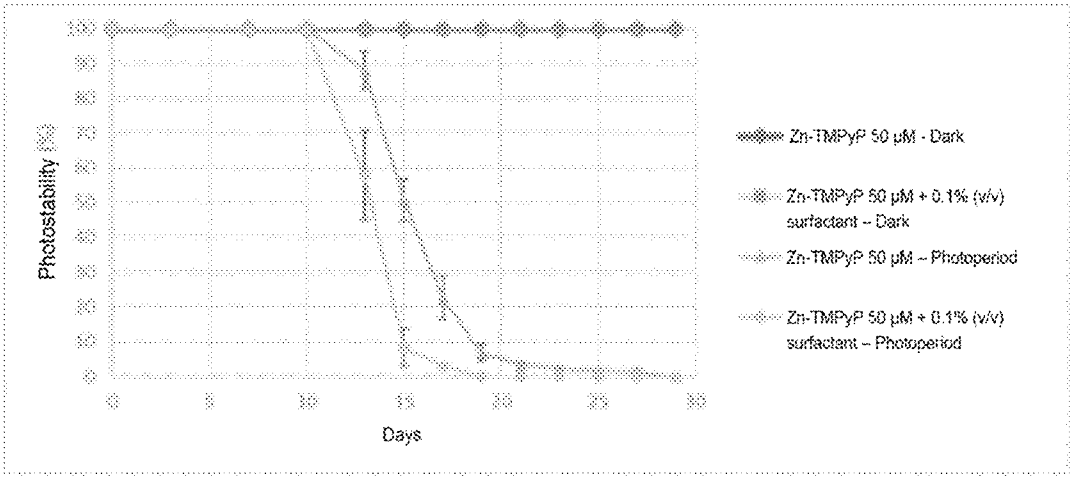

[Fig. 9]
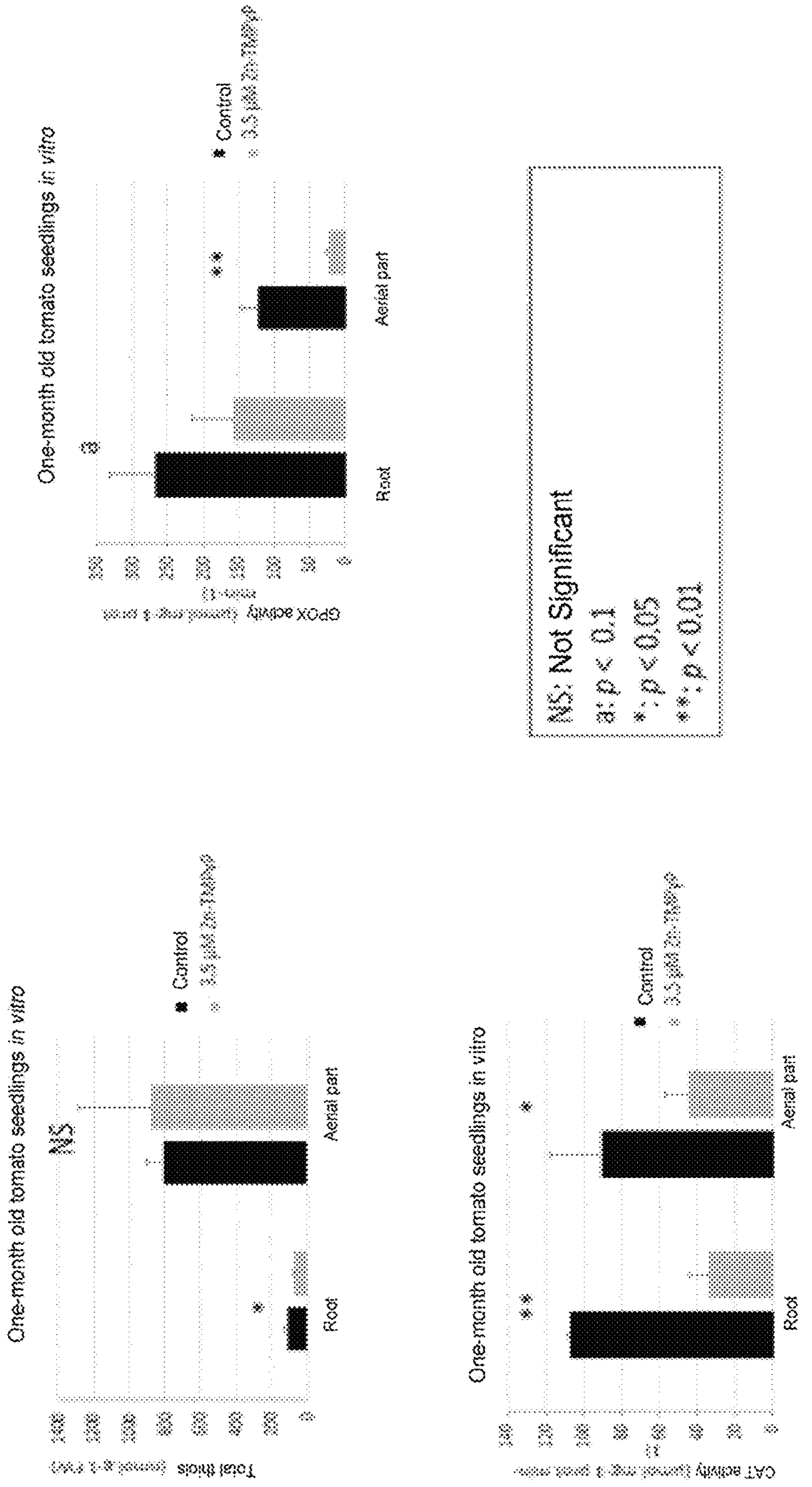

[Fig. 10]
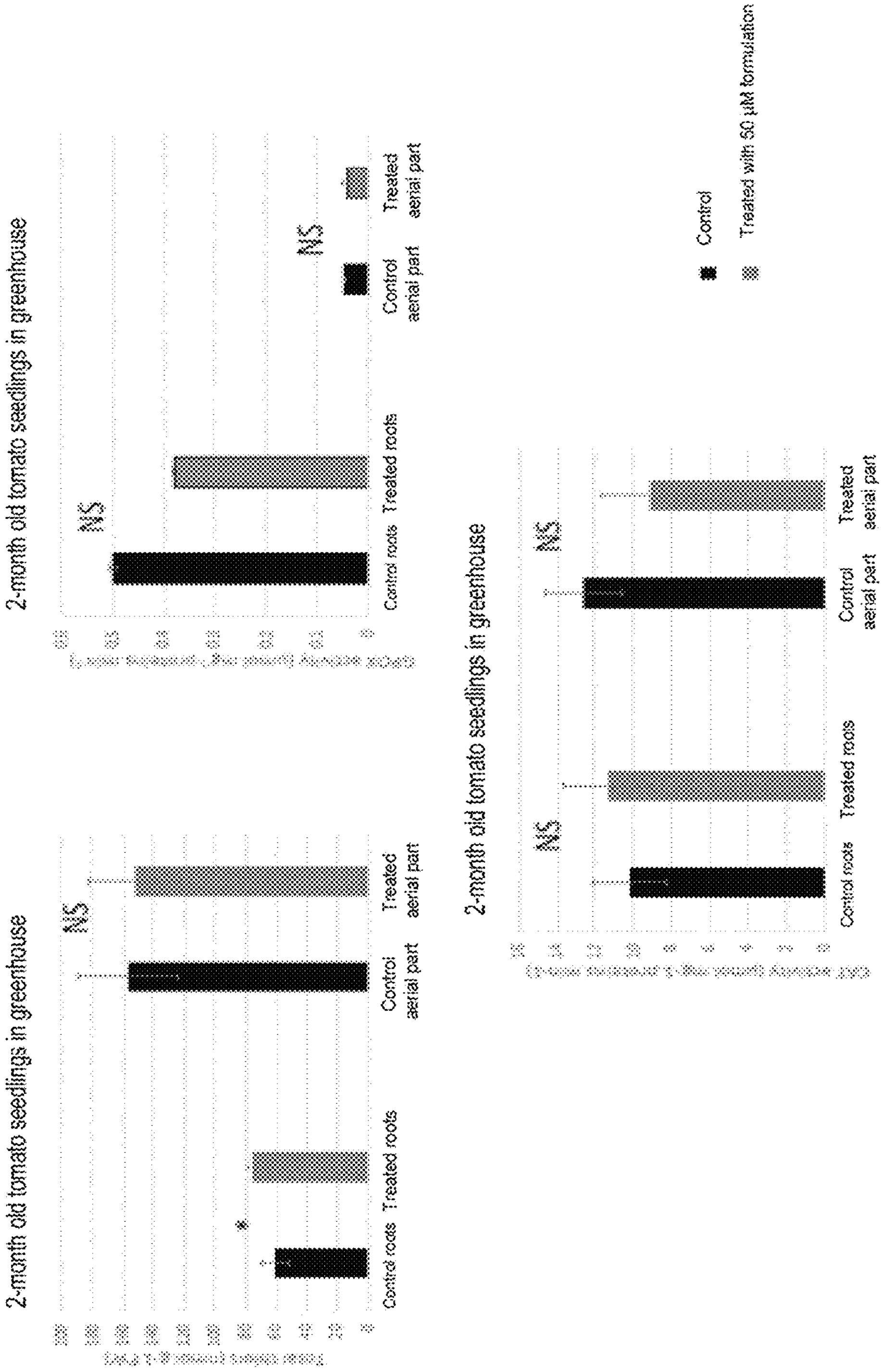

[Fig. 11]
| | [illegible] | | [illegible] | |
|---|---|---|---|---|
| | Roots | Aerial part | Roots | Aerial part |
| Thiols | ↘ ↘ | — | ↗ ↗ | — |
| GPOX | ↘ | ↘ ↘ ↘ | — | — |
| CAT | ↘ ↘ ↘ | ↘ ↘ | — | — |
[Fig. 12]
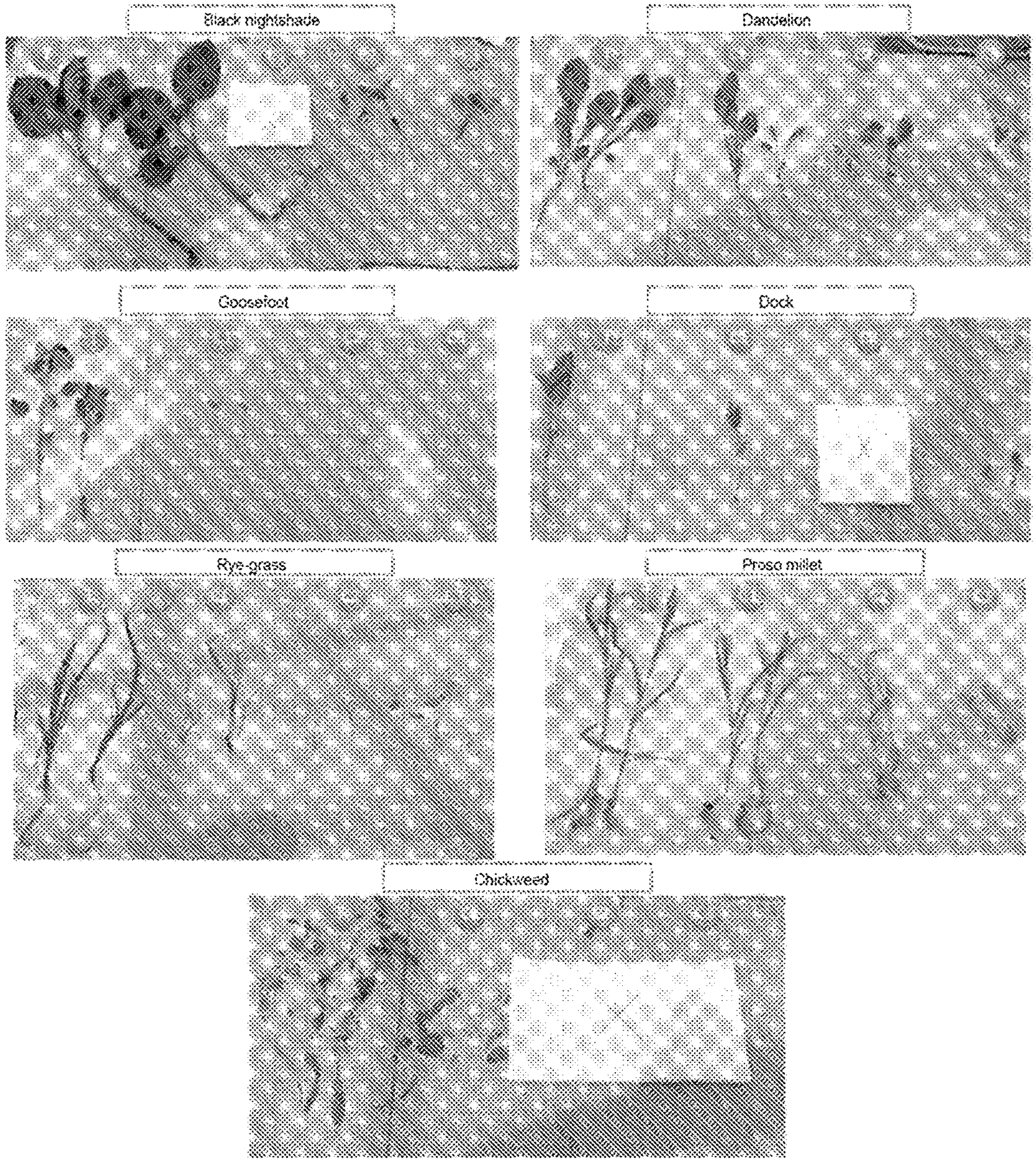

[Fig. 13]
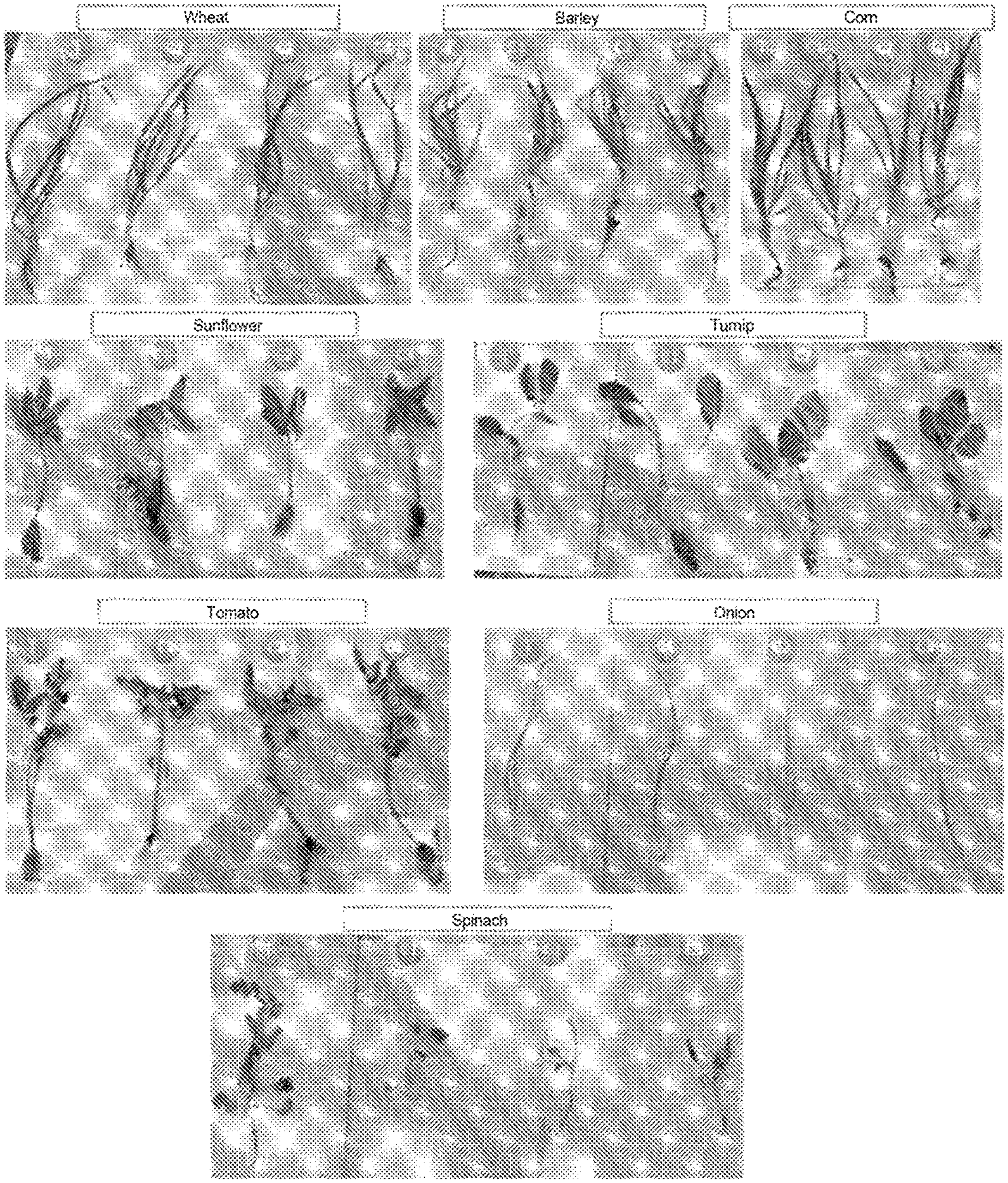

USE OF CATIONIC PORPHYRINS AS SELECTIVE HERBICIDE

TECHNICAL FIELD

The present invention relates to the use of cationic porphyrins such as zinc tetra(N-methylpyridyl)porphyrin tetrachloride and tetra(N-methylpyridyl)porphyrin tetrachloride or a mixture thereof, as selective foliar herbicidal agent.

PRIOR ART

Photosensitizers (PS) are molecules capable of inducing, by virtue of a light stimulus and in the presence of oxygen, the formation of reactive oxygen species (ROSs) that are more or less toxic for living cells, depending on their physicochemical properties, the concentrations used and also the nature of the cells and biological organisms. There are two mechanisms of ROSs production:

- The type I mechanism, which involves a transfer of electrons from the photosensitizer to biological substrates so as to form free radicals (superoxide anion $O_2^-$, hydroxyl radical OH and hydrogen peroxide $H_2O_2$);
- the type II mechanism which for its part involves the transfer of energy to molecular dioxygen, which passes from its ground state (triplet state: $^3O_2$) to the singlet state $^1O_2$.

These photosensitizers are mainly used in the medical field, in the context of photodynamic therapy in cancer treatment but also for the fight against microorganisms such as bacteria and fungi, as disinfection therapy or for the decontamination of water and foodstuffs. In general, ROSs are deleterious to all living cells.

These photosensitizers have therefore been envisaged for application as biocides in the agricultural field, and more particularly against crop pathogens such as bacteria and fungi, which cause reductions in agricultural yield. The use of these photosensitizers as biocide is also called antimicrobial photodynamic therapy.

However, although needed, studies evaluating the undesirable effects of photosensitizers on plants are rare. Moreover, the effects of molecules on plants are very difficult to transpose between different species. Typically, natural photosensitizers (coumarins and furocoumarins) have been evaluated as biocides on orange trees and strawberry plants. While orange tree leaves were not affected by the photosensitizers, strawberry plant leaves were damaged by the coumarins.

Cationic water-soluble porphyrins (zinc tetra(N-methylpyridyl)porphyrin tetrachloride (Zn-TMPyP) and tetra(N-methylpyridyl)porphyrin tetrachloride (TMPyP)) have also been applied to tomato seedlings (*Solanum lycopersicum*) cultivated in vitro under a 16-hour photoperiod. It was demonstrated that the cationic porphyrins significantly altered the seedling growth in vitro. However, the authors suggest that these photosensitizers could be used as biocides against tomato pathogens (Guillaumot et al., Synergistic enhancement of tolerance mechanisms in response to photoactivation of cationic tetra(N-methylpyridyl) porphyrins in tomato plantlets, Journal of Photochemistry and Photobiology B: Biology, Volume 156, March 2016, pages 69-78).

However, these same cationic porphyrins, also tested in vitro on *Arabidopsis* seedlings (*Arabidopsis thaliana*), completely killed the plant at very low dose (3.5 μM) (Issawi et al., Responses of an adventitious fast-growing plant to photodynamic stress: comparative study of anionic and cationic porphyrin effect on *Arabidopsis thaliana*, Physiologia Plantarum (162): 379-390. 2018).

While the in vitro root effect of photosensitizers on plants is unpredictable and difficult to extrapolate to field or greenhouse conditions, and while cationic porphyrins such as Zn-TMPyP applied in vitro at best inhibit the growth of the plants tested and at worst destroy them, the inventors have, unexpectedly, demonstrated that cationic porphyrins and preferentially TMPyP and Zn-TMPyP are selective weedkillers when they are applied by foliar spraying.

SUMMARY

The present invention therefore relates to the use of cationic porphyrins selected from zinc tetra(N-methylpyridyl)porphyrin tetrachloride (Zn-TMPyP) and tetra(N-methylpyridyl)porphyrin tetrachloride (TMPyP) or a mixture thereof, as selective foliar herbicide.

The inventors have specifically advantageously demonstrated that Zn-TMPyP can be used as a selective foliar herbicide. While Zn-TMPyP significantly inhibits plant development (adventitious plants and plants of agronomic interest) when it is applied to plant roots in vitro, the inventors have demonstrated that Zn-TMPyP preserves plants of agronomic interest and does not affect their development when Zn-TMPyP is applied by foliar spraying, typically in a greenhouse. In contrast, this same method (foliar application of Zn-TMPyP in a greenhouse) leads to the death of adventitious plants. Zn-TMPyP is therefore a selective foliar herbicide that makes it possible to combat adventitious plants while preserving crops of agronomic interest.

Moreover, TMPyP and Zn-TMPyP are advantageously photodegradable, thus making it possible to limit their long-term effect. Their non-toxicity to fishing worms (maggots) has also been demonstrated.

Still advantageously, TMPyP and Zn-TMPyP are effective at low concentrations. Typically, glyphosate, which remains the most widely used herbicide in the world, is used at extremely high concentrations (of the order of around 360 g/L). As for the herbicidal compounds according to the invention, they are used at concentrations of the order of micromoles (μM).

These molecules therefore constitute an alternative to the herbicides on the market and are more environmentally friendly and have a reduced impact on human health and animal and plant biodiversity.

The present invention also relates to a selective weed-control method consisting in the application of cationic porphyrins selected from TMPyP, Zn-TMPyP or a mixture thereof, said porphyrins being applied by foliar spraying.

BRIEF DESCRIPTION OF THE DRAWINGS

Other features, details and advantages will become apparent on reading the detailed description below, and on analysing the appended drawings, in which:

FIG. 1 shows the in vitro biocidal effect of 3.5 μM Zn-TMPyP on plants of agronomic interest (barley, tomato, potato, tobacco and grapevine).

FIG. 2 shows the in vitro biocidal effect of 3.5 μM Zn-TMPyP on adventitious plants (nettle, *Arabidopsis* and poppy).

FIG. 3 shows the selective foliar herbicidal effect of Zn-TMPyP in a greenhouse on two crop systems associated with their adventitious plants (barley/poppy and tomato/millet) after two months of treatment with either 50 μM Zn-TMPyP or water (control crop). It should be noted that the poppy is completely destroyed.

FIG. 4 is a comparison demonstrating the in vitro biocidal effect of 3.5 μM Zn-TMPyP on 22-day old tomato seedlings, and the absence of effect of 50 μM Zn-TMPyP on 22-day old greenhouse tomato seedlings, compared to their respective control media.

FIG. 5 is a comparison demonstrating the in vitro biocidal effect of 3.5 μM Zn-TMPyP on 17-day old barley seedlings, and the absence of effect of 50 μM Zn-TMPyP on 22-day old greenhouse barley seedlings, compared to their respective control media.

FIG. 6 is a comparison demonstrating the in vitro biocidal effect of 3.5 μM Zn-TMPyP on 22-day old poppy seedlings, and the effect of 50 μM Zn-TMPyP on greenhouse poppy seedlings, compared to their respective control media.

FIG. 7 shows the harmlessness of Zn-TMPyP 50 μM on the viability of maggots in the presence and in the absence of light 24 hours after treatment by spraying of 50 μM Zn-TMPyP.

FIG. 8 corresponds to the monitoring of the photostability/photodegradation of 50 μM Zn-TMPyP with or without surfactant in water under a photoperiod (16 h light/8 h dark) or in the dark.

FIG. 9 corresponds to the assaying of total thiols and also enzymatic activities (catalase and guaiacol peroxidase) on tomato seedlings cultivated for 1 month in vitro on a 3.5 μM Zn-TMPyP-rich medium.

FIG. 10 corresponds to the assaying of total thiols and also enzymatic activities (catalase and guaiacol peroxidase) on tomato seedlings cultivated for two months in a greenhouse, after foliar application of 50 μM Zn-TMPyP.

FIG. 11 is a schematic comparison of the results presented in FIGS. 8 and 9 showing, in particular, that the in vitro results cannot be extrapolated to the greenhouse results.

FIG. 12 shows the herbicidal effect of Zn-TMPyP against adventitious plants at various concentrations (C1, C2, C3) compared to the control (T).

FIG. 13 shows the harmlessness of Zn-TMPyP against plants of interest at various concentrations (C1, C2, C3) compared to the control (T).

DETAILED DESCRIPTION

The present invention therefore relates to the use of cationic porphyrins selected from zinc tetra(N-methylpyridyl)porphyrin tetrachloride and tetra(N-methylpyridyl)porphyrin tetrachloride or a mixture thereof, as selective foliar herbicide.

Cationic Porphyrins

The porphyrins used according to the invention are tetra (N-methylpyridyl)porphyrin tetrachloride (TMPyP or T4MPyP) of formula (I):

(formula I)

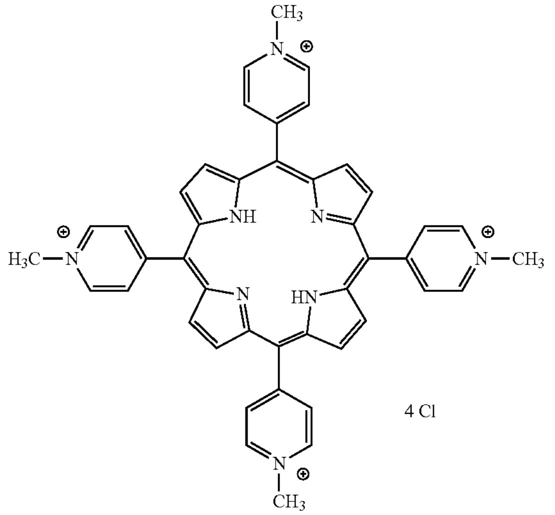

and zinc tetra(N-methylpyridyl)porphyrin tetrachloride, called Zn-TMPyP or Zn-T4MPyP, of formula II, where X is a zinc atom:

(formula II)

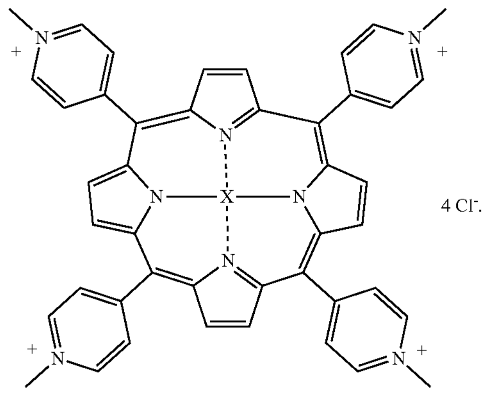

Zn-TMPyP is a cationic porphyrin metallated at the tetrapyrrole nucleus.

Zn-TMPyP and TMPyP are sold by Frontier Scientific (Carnforth, UK).

According to a preferred embodiment, Zn-TMPyP is used as a selective foliar herbicide.

Cultivation Area

Cultivation or cultivation area is intended to mean any area allowing the cultivation of plants and more particularly plants of agronomic interest. Mention will be made, by way of illustration, of a greenhouse, a field, a meadow, a yard, a fairway, a garden, a vegetable garden, etc.

According to one embodiment, the cultivation area is selected from a greenhouse, a field, a meadow, a yard, a fairway, a garden, a vegetable garden.

Selective Foliar Herbicide

An herbicide is a pesticide for agricultural use having an activity on the metabolism of plants which results in their death.

The cationic porphyrins according to the invention are selective herbicides when they are applied by foliar spraying.

Specifically, and in contrast to the in vitro results demonstrating the biocidal effect of Zn-TMPyP, the inventors have advantageously demonstrated that Zn-TMPyP and TMPyP can be used as selective herbicide when they are applied by foliar spraying. The inventors have specifically proven that Zn-TMPyP sprayed in a greenhouse leads to the death of the adventitious plants and preserves the plants of agronomic interest. It has been demonstrated that the plants of interest such as barley and tomato grow perfectly whether in the "control" condition (spraying of $H_2O$) or following the treatment thereof (foliar sprayings of 50 μM Zn-TMPyP). Conversely, the poppy and the millet are completely dead following foliar treatment with Zn-TMPyP. The first symptoms appear 24 h after the first treatment. After 48 hours, the poppy is completely destroyed.

These results are unexpected with regard to the in vitro effects: while the growth of barley and tomato was drastically impacted in vitro by root application of 3.5 μM Zn-TMPyP, foliar spray application of 50 μM Zn-TMPyP had no effect on the growth of the plants of agronomic interest. In contrast, the same dose of Zn-TMPyP leads to the death of the adventitious plants, speaking to the selective herbicidal effect when Zn-TMPyP is applied by foliar spraying.

Thus, Zn-TMPyP and TMPyP are, advantageously, selective foliar herbicides, preferentially when they are applied in a greenhouse.

A foliar herbicide is applied by spraying onto the leaves and requires an adjuvant to help the active ingredient penetrate inside the cells (basipetal translocation). Conversely, in the case of a root herbicide, the active ingredient is absorbed by the roots and conducted via the sap (acropetal translocation).

Thus, and unexpectedly, while Zn-TMPyP has been shown to be a root herbicide in vitro, it is advantageously selective when it is applied by foliar spraying.

A selective herbicide is an herbicide that aims to eliminate adventitious plants without damaging the cultivation area such as a greenhouse, a field, a meadow, a yard, a fairway, a garden. It is therefore a question of combating adventitious plants that are undesirable in crops. Advantageously, the cationic porphyrins according to the invention will destroy the adventitious plants without damaging the plants of agronomic interest.

The term "adventitious plants" is understood to mean any herbaceous or woody plant that is found in an agroecosystem without having been intentionally installed there. For example, it will be an undesirable plant species present in a cultivation area of another plant species.

According to one embodiment, the plants of agronomic interest will be selected from plants of the genus *Nicotiana*, of the genus *Solanum*, of the genus *Vitis*, of the genus *Hordeum*, of the genus *Triticum*, of the genus *Zeya*, of the genus *Helianthus*, of the genus *Allium*, of the genus *Spinacia*, of the genus *Fragaria* and of the genus *Brassica*.

The plants of agronomic interest will be selected from tobacco (*Nicotiana tabacum*), potato (*Solanum tuberosum*), grapevine (*Vitis vinifera*), barley (*Hordeum vulgare*), tomato (*Solanum lycopersicum*), wheat (*Triticum sativum*), corn (*Zeya mays*), sunflower (*Helianthus annuus*), onion (*Allium cepa*), spinach (*Spinacia oleracea*), strawberry (*Fragaria* sp.) and turnip (*Brassica rapa*).

Thus, according to one embodiment, Zn-TMPyP and TMPyP are used for the treatment of crops selected from tobacco (*Nicotiana tabacum*), potato (*Solanum tuberosum*), grapevine (*Vitis vinifera*), barley (*Hordeum vulgare*), tomato (*Solanum lycopersicum*), wheat (*Triticum sativum*), corn (*Zeya mays*), sunflower (*Helianthus annuus*), onion (*Allium cepa*), spinach (*Spinacia oleracea*), strawberry (*Fragaria* sp.) and turnip (*Brassica rapa*) crops.

According to a preferred embodiment, Zn-TMPyP and TMPyP, preferentially Zn-TMPyP, are used for the treatment of crops selected from wheat (*Triticum sativum*), barley (*Hordeum vulgare*), corn (*Zea mays*), sunflower (*Helianthus annuus*), turnip (*Brassica rapa*), tomato (*Solanum lycopersicum*), onion (*Allium cepa*) and spinach (*Spinacia oleracea*) crops.

Zn-TMPyP and TMPyP will be used against adventitious plants selected from adventitious plants of the genus *Urtica*, of the genus *Echinochloa*, of the genus *Papaver*, of the genus *Lolium*, of the genus *Datura*, of the genus *Stellaria*, of the genus *Chenopodium*, of the genus *Panicum*, of the genus *Taraxacum*, of the genus *Rumex* and of the genus *Solanum*.

According to one embodiment, Zn-TMPyP and TMPyP will be used against adventitious plants selected from nettle (*Urtica dioica*), millet (*Echinochloa frumentacea*), poppy (*Papaver rhoeas*), Italian rye-grass (*Lolium multiflorum*), datura (*Datura stramonium*), chickweed (*Stellaria media*), white goosefoot (*Chenopodium album*), proso millet (*Panicum miliaceum*), dandelion (*Taraxacum officinale*), dock (*Rumex crispus*) and black nightshade (*Solanum nigrum*).

According to one embodiment, Zn-TMPyP and TMPyP, and preferentially Zn-TMPyP, are used against adventitious plants selected from black nightshade (*Solanum nigrum*), dandelion (*Taraxacum officinale*), white goosefoot (*Chenopodium album*), dock (*Rumex crispus*), Italian rye-grass (*Lolium multiflorum*), proso millet (*Panicum miliaceum*), chickweed (*Stellaria media*), millet (*Echinochloa frumentacea*) and poppy (*Papaver rhoeas*).

Selective Herbicidal Composition

The present invention also relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being at least 40 mg/L.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being around 44 mg/L.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being at least 60 mg/L.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being around 66 mg/L.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being at least 80 mg/L.

According to one embodiment, the invention relates to a selective herbicidal composition comprising cationic porphyrins selected from zinc tetra(N-methylpyridyl)porphyrin tetrachloride, tetra(N-methylpyridyl)porphyrin tetrachloride or a mixture thereof, and at least one surfactant, the content of cationic porphyrins being around 80 mg/L.

A person skilled in the art is quite capable of determining the concentration to be applied and also the frequency according to the nature of the crops, the surface of the field, the weather conditions, etc.

Typically, the surfactant will be selected from neutral and nonionic surfactants such as polyoxyethylene nonylphenyl ether, anionic surfactants such as the products sold under the name Clasoft®, Texapon®, cationic surfactants such as benzalkonium chloride (BAC) or benzethonium chloride (BZT) and zwitterionic neutral surfactants.

Preferentially, the surfactant is polyoxyethylene nonylphenyl ether (Igepal CO-630, Sigma Aldrich).

According to one embodiment, the selective herbicidal composition comprises zinc tetra(N-methylpyridyl)porphyrin tetrachloride and polyoxyethylene nonylphenyl ether.

Weed-Control Method

The present invention also relates to a selective weed-control method comprising at least one step of applying cationic porphyrins selected from zinc tetra(N-methylpyridyl)porphyrin tetrachloride, tetra(N-methylpyridyl) porphyrin tetrachloride or a mixture thereof in a cultivation area, said porphyrins being applied by foliar spraying.

Preferentially, the cultivation area is selected from a greenhouse, a field, a meadow, a yard, a fairway, a garden, a vegetable garden, etc.

The term "foliar spraying" is understood to mean the application of the porphyrins according to the invention to the aerial parts of adventitious plants and plants of agronomic interest in cultivation, and preferentially the application to the leaves of adventitious plants and plants of agronomic interest in cultivation.

According to one embodiment of the weed-control method, TMPyP and Zn-TMPyP are sprayed at the cotyledon stage and/or at the first-leaf stage such as the 2-leaf stage and/or 4-leaf stage.

The term "cotyledonary stage" or "cotyledon stage" is understood to mean the stage of emergence of the embryonic leaves.

The term "first-leaf stage" is understood to mean the stage of development of the true leaves.

Selective Herbicidal Method

The invention also relates to a selective weed-control method, the method comprising the application, to a cultivation area, of cationic porphyrins selected from zinc tetra (N-methylpyridyl)porphyrin tetrachloride, tetra(N-methylpyridyl)porphyrin tetrachloride or a mixture thereof, said porphyrins being applied by foliar spraying.

Preferentially, the cultivation area is selected from a greenhouse, a field, a meadow, a yard, a fairway, a garden, a vegetable garden, etc.

According to one embodiment of the weed-control method, TMPyP and Zn-TMPyP are sprayed at the cotyledon stage and/or at the 2-leaf stage and/or 4-leaf stage.

EXAMPLES

Materials and Methods

In the examples which follow, the materials and methods described below were used.

Cationic Porphyrins

The cationic porphyrin metallated at the tetrapyrrole nucleus that is used is zinc tetra(N-methylpyridyl)porphyrin tetrachloride, called Zn-TMPyP, (sold by Frontier Scientific (Carnforth, UK)). The stock solution prepared at 1 mM in water is stored in the dark at ambient temperature.

Formulation for Foliar Spraying

50 μM Zn-TMPyP dissolved in water+0.1% v/v of a neutral and nonionic surfactant (polyoxyethylene nonylphenyl ether) (Igepal CO-630, Sigma Aldrich).

Photostability/Photodegradation Test

The photostability/photodegradation of Zn-TMPyP was tested in water under a 16 h photoperiod and in the dark with or without surfactant. Zn-TMPyP mixed with 0.1% v/v of surfactant is tested at 50 μM under a photoperiod and in the dark by monitoring the absorption of the Soret band by UV-visible spectrometry. Monitoring the intensity of the Soret band as a function of the irradiation time makes it possible to calculate the percentage of degraded porphyrins.

Plant Models

Nine plant species belonging to several large families were tested according to the following conditions:

TABLE 1

| Seedling family | Species tested | Classification |
|---|---|---|
| Solanaceae | Tomato *Solanum lycopersicum* var Marmande | dicot |
| Solanaceae | Potato (*Solanum tuberosum*) cultivar: Coquine | dicot |
| Solanaceae | Tobacco (*Nicotiana benthamiana*) | dicot |
| Poaceae | Barley (*Hordeum sativum*) | monocot |
| Vitaceae | Grapevine (*Vitis vinifera*) cultivar: Sauvignon (clone 379) | perennial |
| Papaveraceae | Poppy (*Papaver rhoeas*) | dicot |
| Brassicaceae | *Arabidopsis thaliana* ws ecotype | dicot |
| Poaceae | Millet *Echinochloa frumentacea* | monocot |
| Urticaceae | Common nettle *Urtica dioica* | dicot |

Sterilization of the Seeds/Caryopses

The sterilization of the seeds is carried out according to the following protocol. Surface sterilization is first performed with 70% (v/v) ethanol for 2 minutes at ambient temperature. The ethanol is removed and the seeds are immersed in 20% (v/v) sodium hypochlorite for 15-20 minutes and then thoroughly rinsed with sterile water. The barley caryopses are left in the water for at least one hour before cultivation.

Germination of the Seeds

The germination medium for all of the seeds is Gamborg's synthetic medium, also referred to as B5, (Duchefa Biochemie, Haarlem, the Netherlands), supplemented with 2% sucrose (w/v) and solidified with 0.8% agar (Difco, Dallas, USA). The pH is adjusted to 5.8 with 1 M sodium hydroxide before autoclaving. After autoclaving (120° C., 20 minutes, 1 bar) and cooling of the medium in Petri dishes and/or jars, porphyrin is added at the desired concentration. After sterilization, the seeds are deposited on the solidified B5 medium containing or not containing the porphyrin, under a laminar flow hood. The Petri dishes and jars are placed in culture chambers (16 h photoperiod, 22° C., photon flux density ~100 $\mu mol \cdot m^{-2} \cdot s^{-1}$ generated by cool daylight lamps (OSRAM Lumilux 24W)). The jars are used for the transfer of the seedlings and allow them to grow more appropriately.

In Vitro Propagation of Clones

Explants are propagated in a sterile manner from 1-month old seedlings for potato and two-month old seedlings for grapevines. The potato explants are propagated on a Murashige and Skoog synthetic medium supplemented with 2% sucrose and myo-inositol ((100 mg/L), pH 5.8. The grapevine explants are cultivated on ½ Chee and Pool medium supplemented with 2% sucrose, pH 5.9. The media are solidified with 0.8% Sobigel. Both media are supplied by Duchefa Biochemie, Haarlem, the Netherlands. The media are autoclaved as described above for the B5 medium. The grapevine explants are placed in a culture chamber at 25° C. and those of potato at 23° C., the same photoperiod and light intensity as for the seed germinations.

Cultivation in Greenhouse

The various seeds are cultivated in a greenhouse in commercial compost (universal compost, Fertiligene). The seeds were sown in the greenhouse under controlled temperature and humidity conditions (the temperature varies between 15° C. and 30° C. depending on the season, and the relative humidity varies from 50 to 70%).

Two spot treatments (about 10 sprays each) spaced 48 h apart were carried out one week after germination. The first treatment was carried out when the seedlings were in the cotyledon stage, the second when the seedlings were in the first-leaf stage.

After two months, the seedlings were harvested. The roots and the aerial parts were separated and the roots were washed with distilled water and dried on absorbent paper. These materials were then stored at −20° C. until being used for the various biochemical analyses.

Biochemical Tests

Determination of Total thiols

Seedlings (roots and aerial parts separated before freezing) are ground in liquid nitrogen. The powder is transferred into an Eppendorf tube and weighed (between 200 and 100 mg per extraction). The extract is acidified with 0.2 N vortexed HCl and centrifuged (13 000 g 10 min 4° C.). 500 μL of the supernatant is neutralized with 400 μL of NaOH (0.2 N) and 50 μL of $Na_2HPO_4$. Then, 700 μL of 0.12 M $Na_2HPO_4$, 6 mM EDTA and 6 mM DTNB are added to 200 μL of the neutralized solution. After establishing a glutathione range, the total thiols contained in the samples are determined by UV-vis spectrometry at 412 nm and related to the fresh weight.

Enzymatic Activities

Seedlings (roots and aerial parts separated before freezing) are ground in liquid nitrogen. The powder is transferred into an Eppendorf tube into which 50 mg of PolyVinylPolyPyrrolidone (PVPP) (Sigma) have been weighed beforehand. PVPP makes it possible to remove the polyphenols present in the organs which would be liable to interfere with the biochemical assays. The ground material is taken up in extraction buffer (25 mM phosphate buffer, pH 7.8, 10% (v/v) glycerol, and 1 mM EDTA). The tubes are then centrifuged for 20 minutes at 14 000 rpm at 4° C. and the supernatants are stored at 4° C. for assaying of the proteins or stored at −20° C. For assaying the proteins, use is made of the Bradford assay method (Bradford, 1976) and BSA for the standard range.

Determination of Catalase Activity (CAT)

Catalase is an enzyme of the oxidoreductase family. Catalase activity is quantifiable by measuring the disappearance of $H_2O_2$ by disproportionation into $H_2O$ and $O_2$. To determine this activity, use is made of the protocol implemented in the publication by Issawi. et al. (2018). The kinetics of the disappearance of $H_2O_2$ are measured for 200 seconds every 20 seconds at 240 nm. The activity is calculated using the molar extinction coefficient of $H_2O_2$ which is 43.6 $mM^{-1}\cdot cm^{-1}$.

Determination of Guaiacol Peroxidase (GPOX) Activity

Guaiacol peroxidase is an enzyme found only in plants. It detoxifies the plant of oxygen peroxide molecules produced by fungus. Its activity is measured by the oxidation of guaiacol in the presence of $H_2O_2$. To determine this activity, use is made of the protocol described in the publication by Issawi et al. (2018). The kinetics of the appearance of the oxidized guaiacol are measured for 120 seconds every 10 seconds at 436 nm. The activity is calculated using the molar extinction coefficient of $H_2O_2$ which is 25.5 $mM^{-1}\cdot cm^{-1}$.

The biochemical tests were performed over 3 independent experiments and statistically validated using PAST software.

Example 1: Demonstration of the Selective Foliar Herbicidal Effect of Zn-TMPyP vs the In Vitro Biocidal Effect of Zn-TMPyP A. In Vitro Biocidal Effect: Situation with Plants of Agronomic Interest The results are presented in FIG. 1.

To avoid mechanical stresses, the results presented below relating to barley and tomato are results after 17 and 22 days respectively. This is because the seedlings will grow rapidly on the control media (without Zn-TMPyP) and touch the lid of the jars, compared to the other crops.

Barley

It is clearly apparent that the growth of the barley is adversely impacted after one month of cultivation on 3.5 μM Zn-TMPyP-rich medium. In addition, the leaves exhibit yellowing followed by wilting. In contrast, in control medium, the barley grows normally and displays a rapid and perfect growth after 17 days.

Tomato

In accordance with the results of the prior art (Guillaumot et al.), tomato (Marmande variety) displays a significantly inhibited development after 22 days on the 3.5 μM Zn-TMPyP-rich medium compared with the "control" condition.

Potato

The potato (Coquine variety) displays a slight growth retardation at the stem and roots on the treated medium compared to the seedlings of the control condition.

Tobacco and Grapevine

Tobacco and grapevine seedlings show considerable inhibition of their development after one-and-a-half months and two months of cultivation, respectively, on 3.5 μM Zn-TMPyP-rich medium (FIG. 1).

Conclusion: In Vitro Biocidal Effect of Zn-TMPyP on the Plants of Agronomic Interest After treatment with Zn-TMPyP, the plants of agronomic interest at best exhibit growth retardation. In the majority of cases, the growth of these plants is inhibited by Zn-TMPyP, compared to the control medium. It is thus very clearly apparent that Zn-TMPyP has a biocidal effect in vitro on plants of agronomic interest.

B. In Vitro Biocidal Effect: Situation with Adventitious Plants

The results are presented in FIG. 2.

Nettle and *Arabidopsis*

Nettle and *Arabidopsis* display a very significant inhibition of growth on a medium treated with Zn-TMPyP (3.5 μM) after 18 days and 1 month, respectively.

Poppy

In the case of poppy, the seedlings display different responses that speak to a remarkable adverse impact and inhibition after 6 weeks.

Conclusion: In Vitro Biocidal Effect of Zn-TMPyP on Adventitious Plants

In accordance with the results obtained on the plants of agronomic interest, the growth of the adventitious plants is inhibited by Zn-TMPyP, speaking to its in vitro biocidal effect.

The in vitro results speak to a root herbicidal effect of Zn-TMPyP.

C. Selective Foliar Herbicidal Effect: Tests in Greenhouse

The results are presented in FIGS. 3 to 6.

Tests were carried out on two cultivation systems associated with their adventitious plants:

barley (grass) with poppy (dicot)

tomato (dicot) with millet (grass)

with spraying of 50 μM Zn-TMPyP at two times spaced 48 h apart one week after germination. The seedlings were monitored every 48 h. The control medium was sprayed with water at the same frequency.

The results after one month and two months show that the plants of interest grow perfectly whether in the "control" condition or following the treatment thereof (about 10 foliar sprayings) with 50 μM Zn-TMPyP. Conversely, the poppy and the millet are completely dead following their treatment. The first symptoms appear 24 h after the first treatment and the poppy is destroyed at the end of 48 h after the first treatment (first 10 sprayings).

While the growth of barley and tomato was drastically adversely impacted in vitro by 3.5 μM Zn-TMPyP, foliar spray application of 50 μM Zn-TMPyP had no effect on the growth of the plants of agronomic interest. In contrast, the same dose of Zn-TMPyP leads to the death of the adventitious plants, speaking to the selective herbicidal effect when Zn-TMPyP is applied by foliar spraying. These results speak to the selective foliar herbicidal effect of Zn-TMPyP.

These tests also confirm that the results obtained in vitro are not necessarily and automatically transposable to the greenhouse scale. Indeed, barley and tomato display significantly inhibited development in vitro. In contrast, no visible effect is observed on these greenhouse crops. On the other hand, the poppy is completely destroyed following foliar spraying in the greenhouse, while different responses are observed from seedlings cultivated in vitro: some seedlings exhibit significant inhibition of growth and others exhibit growth retardation.

D. Mechanism of Action

The total thiols, and also the enzymatic activity (catalase activity and guaiacol peroxidase activity) were determined on seedlings cultivated in vitro on the 3.5 μM Zn-TMPyP-rich medium (FIG. 9) and on seedlings subjected to 50 μM Zn-TMPyP by foliar application (FIG. 10).

The antioxidant machinery is significantly inhibited in seedlings cultivated on the 3.5 μM Zn-TMPyP-rich medium. In contrast, the antioxidant enzymes and molecules remain constant in seedlings treated with 50 μM Zn-TMPyP in the greenhouse, apart from an increase in thiols in the roots (FIG. 11).

These tests confirm that the ability of Zn-TMPyP to be a selective foliar herbicide was unexpected, based on in vitro tests.

Lastly, it should be noted that the effect following the foliar spraying of Zn-TMPyP is not foreseeable according to the nature of the plant group: the development of barley (grass) and tomato (dicot) is not affected following the foliar spraying of Zn-TMPyP. However, the opposite effect is obtained on plants of the same group: poppy (dicot) and millet (grass) are completely dead after foliar spraying of Zn-TMPyP.

Example 2: Determination of the Non-Toxicity of Zn-TMPyP to Fishing Worms (Maggots)

The maggots were placed in Petri dishes under a photoperiod (16 h) or under dark conditions in a phytotron (24° C.) for 24 h. 30 maggots per Petri dish were subjected to 10 sprayings of $H_2O$ or 50 μM Zn-TMPyP. The percentage viability was determined after 24 h.

5 to 10% of the maggots die under normal conditions ($H_2O$ spraying) and after treatment with Zn-TMPyP, establishing the harmlessness of Zn-TMPyP on fishing worms (FIG. 7).

Zn-TMPyP is advantageously more environmentally friendly by having a reduced impact on animal biodiversity.

Example 3: Photostability/Photodegradation of Zn-TMPyP

In the dark, Zn-TMPyP remains perfectly stable with or without surfactant for 29 days of monitoring (FIG. 8).

Under a photoperiod (16 h light/8 h dark), the stability of Zn-TMPyP (with or without surfactant) dropped sharply starting from the 10th day. It is completely photodegraded between the 17th and 19th day. As for the solution without surfactant, about 93% of Zn-TMPyP is photodegraded after 19 days under a photoperiod, and then this solution continues to photodegrade slowly and disappears after 29 days of the photoperiod.

This monitoring was carried out by performing 3 independent experiments.

Monitoring shows that the half-life of the weedkiller solution in water is two weeks when it is exposed to light (this will be the case when the solution is sprayed on plants in the wild). The absolute stability of the solution in the dark will ensure the effective storage of the product for long periods, in its opaque packaging, until its use.

Thus, the photodegradability of Zn-TMPyP makes it possible to limit its long-term effects and speaks in favor of its harmlessness for the environment and humans.

Example 4: Selective Foliar Herbicidal Effect of Zn-TMPyP—Greenhouse Test

Materials and Methods

Additional tests in a greenhouse were carried out. All of the plants underwent 5 treatments (foliar sprayings) with 3 different doses C1, C2 or C3 of Zn-TMPyP, each treatment being spaced 48 hours apart. The treatments started at the cotyledon stage. The harvesting was carried out 6 weeks after germination (and 10 weeks for barley).

The doses of Zn-TMPyP are as follows:

C1=50 μM; C2=75 μM; C3=100 μM

Zn-TMPyP was formulated with 0.1% v/v of polyoxyethylene nonylphenyl ether.

The species of plants used are listed in the table below:

TABLE 2

| Seedling family | Species tested | Classification |
|---|---|---|
| Solanaceae | Tomato *Lycopersicum esculentum* variety Marmande | Dicotyledonous |
| Poaceae | Barley (*Hordeum sativum*) | Monocotyledonous |
| Poaceae | Wheat (*Triticum sativum*) | Monocotyledonous |
| Amaranthaceae | Spinach (*Spinacia oleracea*) | Dicotyledonous |
| Brassicaceae | Turnip (*Brassica rapa*) | Dicotyledonous |
| Poaceae | Corn (*Zea mays*) | Monocotyledonous |
| Liliaceae | Onion (*Allium cepa*) | Monocotyledonous |
| Asteraceae | Sunflower (*Helianthus annuus*) | Dicotyledonous |
| Amaranthaceae | Goosefoot (*Chenopodium album*) | Dicotyledonous |
| Poaceae | Proso millet (*Panicum miliaceum*) | Monocotyledonous |
| Poaceae | Rye-grass (*Lolium multiflorum*) | Monocotyledonous |
| Polygonaceae | Dock (*Rumex crispus*) | Perennial dicotyledonous |
| Solanaceae | Black nightshade (*Solanum nigrum*) | Dicotyledonous |
| Asteraceae | Dandelion (*Taraxacum officinale*) | Dicotyledonous |
| Caryophyllaceae | Chickweed (*Stellaria media*) | Dicotyledonous |

Results

The results after 6 weeks (10 for barley) show that treatment with Zn-TMPyP drastically adversely impacts the growth of the adventitious plants, either in a dose-dependent manner or at a specific dose. Certain concentrations of Zn-TMPyP completely destroy the adventitious plants. (FIG. 12).

In contrast, and regardless of the concentrations applied, the plants of interest grow perfectly after application of Zn-TMPyP by foliar spraying. The growth of the plants of interest is specifically not adversely impacted. Only the growth of spinach is slightly affected. (FIG. 13).

These results confirm the selective foliar herbicidal effect of Zn-TMPyP.

The invention claimed is:

1. A selective weed-control method in a cultivation area, comprising applying one or more cationic porphyrins selected from a zinc tetra(N-methylpyridyl)porphyrin tetrachloride, a tetra(N-methylpyridyl)porphyrin tetrachloride and a mixture thereof; said porphyrins being applied by foliar spraying onto the cultivation area, wherein the cultivation area contains both crop and non-crop plants and wherein the porphyrins selectively kill the non-crop plants.

2. The method as claimed in claim 1, characterized in that the one or more cationic porphyrins are zinc tetra(N-methylpyridyl)porphyrin tetrachlorides.

3. The method as claimed in claim 1, characterized in that the cultivation area is selected from a field, a greenhouse, a meadow, a yard, a fairway, a garden, and a vegetable garden.

4. The method of claim 1, wherein the cultivation area comprises one or more crops of a genus selected from the group consisting of *Nicotiana, Solanum, Vitis, Hordeum, Triticum, Zeya, Helianthus, Allium, Spinacia, Fragaria* and *Brassica*.

5. The method as claimed in claim 1, wherein the cultivation area comprises one or more crops selected from wheat (*Triticum sativum*), barley (*Hordeum vulgare*), corn (*Zeya mays*), sunflower (*Helianthus annuus*), turnip (*Brassica rapa*), tomato (*Solanum lycopersicum*), onion (*Allium cepa*) and spinach (*Spinacia oleracea*) crops.

6. The method as claimed in claim 1, characterized in that said one or more cationic porphyrins have an herbicidal effect on weeds of a genus selected from the group consisting of *Urtica, Echinochloa, Papaver, Lolium, Datura, Stellaria, Chenopodium, Panicum, Taraxacum, Rumex*, and *Solanum*.

7. The method as claimed in claim 1, characterized in that said one or more cationic porphyrins have an herbicidal effect on weeds selected from black nightshade (*Solanum nigrum*), dandelion (*Taraxacum officinale*), white goosefoot (*Chenopodium album*), dock (*Rumex crispus*), Italian ryegrass (*Lolium multiflorum*), proso millet (*Panicum miliaceum*), chickweed (*Stellaria media*), millet (*Echinochloa frumentacea*) and poppy (*Papaver rhoeas*).

8. The method as claimed in claim 1, characterized in that said one or more cationic porphyrins are applied at a cotyledon stage and/or at a first-leaf stage.

9. The method as claimed in claim 8, wherein the first-leaf stage is a 2-leaf stage and/or a 4-leaf stage.

10. The method as claimed in claim 1, wherein the cultivation area is a field, a greenhouse, a meadow, a yard, a fairway, a garden, or a vegetable garden.

11. The method according to claim 1, wherein said one or more cationic porphyrins are applied by at least two foliar applications.

12. The method according to claim 1, wherein said one or more cationic porphyrins are in the form of a composition comprising at least one surfactant selected from neutral, nonionic, anionic, cationic, and zwitterionic neutral surfactants.

13. The method according to claim 1, wherein said one or more cationic porphyrins are applied by at least two foliar applications and are in the form of a composition comprising at least one surfactant selected from neutral, nonionic, anionic, cationic, and zwitterionic neutral surfactants.

14. The method according to claim 12, wherein said surfactant is selected from polyoxyethylene nonylphenyl ether, benzalkonium chloride (BAC), and benzethonium chloride (BZT).

15. The method according to claim 13, wherein said surfactant is selected from polyoxyethylene nonylphenyl ether, benzalkonium chloride (BAC), and benzethonium chloride (BZT).

16. The method according to claim 1, wherein the porphryins are present in a composition having a concentration of porphryins of at least 50 μM.

17. The method according to claim 1, wherein the cultivation area does not contain *Arabidopsis thaliana*.

* * * * *